US008324782B2

(12) United States Patent
Minami et al.

(10) Patent No.: US 8,324,782 B2
(45) Date of Patent: Dec. 4, 2012

(54) ROTARY ELECTRIC MACHINE

(75) Inventors: Shinichiro Minami, Chiyoda-ku (JP); Kazunori Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 24 days.

(21) Appl. No.: 13/179,203

(22) Filed: Jul. 8, 2011

(65) Prior Publication Data

US 2012/0212096 A1 Aug. 23, 2012

(30) Foreign Application Priority Data

Feb. 21, 2011 (JP) ................................ 2011-034244

(51) Int. Cl.
*H02K 21/04* (2006.01)

(52) U.S. Cl. .............. 310/263; 310/156.66; 310/156.71; 310/181

(58) Field of Classification Search .......... 310/156.61–156.69, 156.71–156.79, 310/181, 257, 263
See application file for complete search history.

(56) References Cited

U.S. PATENT DOCUMENTS

| | | | | |
|---|---|---|---|---|
| 7,893,594 | B2 * | 2/2011 | Fujita et al. | 310/263 |
| 8,179,015 | B2 * | 5/2012 | Nishikawa et al. | 310/263 |
| 8,198,777 | B2 * | 6/2012 | Hamada | 310/156.72 |
| 2001/0011856 | A1 * | 8/2001 | Asao et al. | 310/263 |
| 2008/0211337 | A1 * | 9/2008 | Lutz et al. | 310/156.66 |

FOREIGN PATENT DOCUMENTS

JP 2010-187476 A 8/2010

* cited by examiner

*Primary Examiner* — Quyen Leung
*Assistant Examiner* — Naishadh Desai
(74) *Attorney, Agent, or Firm* — Sughrue Mion, PLLC

(57) ABSTRACT

A bobbin is mounted to a rotor such that a rotation arresting portion is housed in a space that is formed by a rotation arresting portion housing recess portion and a stepped portion so as to restrict circumferential movement, and a permanent magnet is made into a quadrangular prism that has a rectangular bottom surface, and is held by a magnet holding seat by placing a bottom surface on an upper surface of a magnet holding portion, and fixing to the magnet holding seat a cover that is mounted from radially outside to restrict circumferential, axial, and radial movement.

9 Claims, 8 Drawing Sheets

15 23 51 26 22 19 47 40 41 42 48 35 25 37 36 31 24 16 17 27 28 21 30 29 20

40C 47a 47 41 47b 48 42C 43 45C 44C

ROTARY ELECTRIC MACHINE

BACKGROUND OF THE INVENTION

1. Field of the Invention

The present invention relates to a rotary electric machine such as an automotive alternator, and particularly relates to a permanent magnet holding construction in a Lundell rotor.

2. Description of the Related Art

Automotive alternators that use Lundell rotors have been used in automobiles for decades. Loads from electrical equipment that is mounted due to environmental issues have been increasing rapidly in recent years, and further increases in generated power are being sought from Lundell rotors.

In view of these conditions, generated power has conventionally been increased by disposing permanent magnets on yoke portions of a Lundell rotor so as to face claw-shaped magnetic pole portions to alleviate magnetic saturation of the pole core (See Patent Literature 1, for example).

Patent Literature 1: Japanese Patent Laid-Open No. 2010-187476 (Gazette)

In conventional automotive alternators such as that described in Patent Literature 1, in order to increase resistance of the permanent magnet holding construction to centrifugal forces, permanent magnets are held in magnet holders by being fitted into magnet interfitting grooves that have trapezoidal cross sections that are formed on upper surfaces of the magnet holders. For this reason, because the cross-sectional shape of the permanent magnets is a trapezoidal shape, for example, and the volume of the permanent magnets cannot be increased, and increases in the amount of power generated due to disposing the permanent magnets are reduced.

In conventional automotive alternators such as that described in Patent Literature 1, because no consideration has been given to preventing rotation of a bobbin onto which a field coil is wound that is mounted to a boss portion between yoke portions, one disadvantage has also been that when the rotor is rotated at high speed and a high angular speed is applied to the bobbin, the bobbin may rotate around the axis of the boss portion, causing breakages in output wires of the field coil.

SUMMARY OF THE INVENTION

The present invention aims to solve the above problems and an object of the present invention is to provide a rotary electric machine that can increase generated power by enabling a large-volume permanent magnet to be held while preventing interference with a rotation arresting portion of a bobbin onto which a field coil is wound, to suppress occurrences of breakages of output wires in the field coil, etc.

In order to achieve the above object, according to one aspect of the present invention, there is provided a rotary electric machine including: a rotor including: a pole core including: a boss portion; a pair of yoke portions that are disposed so as to extend radially outward from two axial end edge portions of the boss portion; and a plurality of claw-shaped magnetic pole portions that are disposed so as to extend in an axial direction alternately from each of the pair of yoke portions, and that are arranged circumferentially so as to intermesh with each other, a trough portion that curves radially inward being formed on a portion of each of the yoke portions between circumferentially adjacent claw-shaped magnetic pole portions, and the pole core being fixed to a shaft that is inserted through a central axial position of the boss portion; and a field coil that is wound onto a bobbin that is mounted to the boss portion, and that is housed inside a space that is surrounded by the boss portion, the pair of yoke portions, and the plurality of claw-shaped magnetic pole portions; a stator that is disposed so as to surround an outer circumference of the rotor; and a permanent magnet that is disposed in the trough portion so as to face an inner circumferential surface near a tip end of the claw-shaped magnetic pole portions. The rotary electric machine further includes: an interfitting groove that is disposed in a bottom portion of the trough portion so as to have a groove direction that is axial and so as to extend axially outward from axially inside; a rotation arresting portion housing recess portion that is formed on an axially inner opening edge portion of the interfitting groove on the yoke portions; a magnet holding seat including: an interfitting portion; and a magnet holding portion that is formed on an upper portion of the interfitting portion, the magnet holding seat being disposed in the trough portion such that radial movement is restricted by the interfitting portion being fitted into the interfitting groove; and a rotation arresting portion that is disposed so as to project axially outward from a flange portion of the bobbin. The magnet holding seat includes a stepped portion that is formed by setting back an axially inner end surface of the interfitting portion axially outward relative to an axially inner end surface of the magnet holding portion, the bobbin is mounted to the rotor such that the rotation arresting portion is housed in a space that is formed by the rotation arresting portion housing recess portion and the stepped portion so as to restrict circumferential movement, and the permanent magnet is made into a quadrangular prism that has a rectangular bottom surface, and is held by the magnet holding seat by placing the bottom surface on an upper surface of the magnet holding portion, and fixing to the magnet holding seat a cover that is mounted from radially outside to restrict circumferential, axial, and radial movement.

According to the present invention, the axially inner end surface of the interfitting portion of the magnet holding seat is set back axially outward to form the stepped portion, and the rotation arresting portion of the bobbin is housed in the space formed by the rotation arresting portion housing recess portion and the stepped portion. Thus, rotation of the bobbin is prevented, suppressing occurrences such as wire breakage of the output wires of the field coil. The magnet holding portion can also be moved closer to the field coil, and magnetic flux that is generated by the permanent magnet flows between the permanent magnet and the claw-shaped magnetic pole portions efficiently, enabling increases in the amount of power generated.

Because the permanent magnet is made into a quadrangular prism that has a rectangular bottom surface, the volume of the permanent magnet can be increased, enabling increases in the amount of power generated. In addition, because the permanent magnet is held by the magnet holding seat by fixing the cover that is mounted so as to envelop the permanent magnet to the magnet holding seat, the entire upper surface of the magnet holding portion is made into a mounting surface for the permanent magnet, enabling further increases in the volume of the permanent magnet, thereby enabling even greater increases in the amount of power generated.

DETAILED DESCRIPTION OF THE PREFERRED EMBODIMENTS

Preferred embodiments of a rotary electric machine according to the present invention will now be explained using drawings.

Embodiment 1

Figure 1:
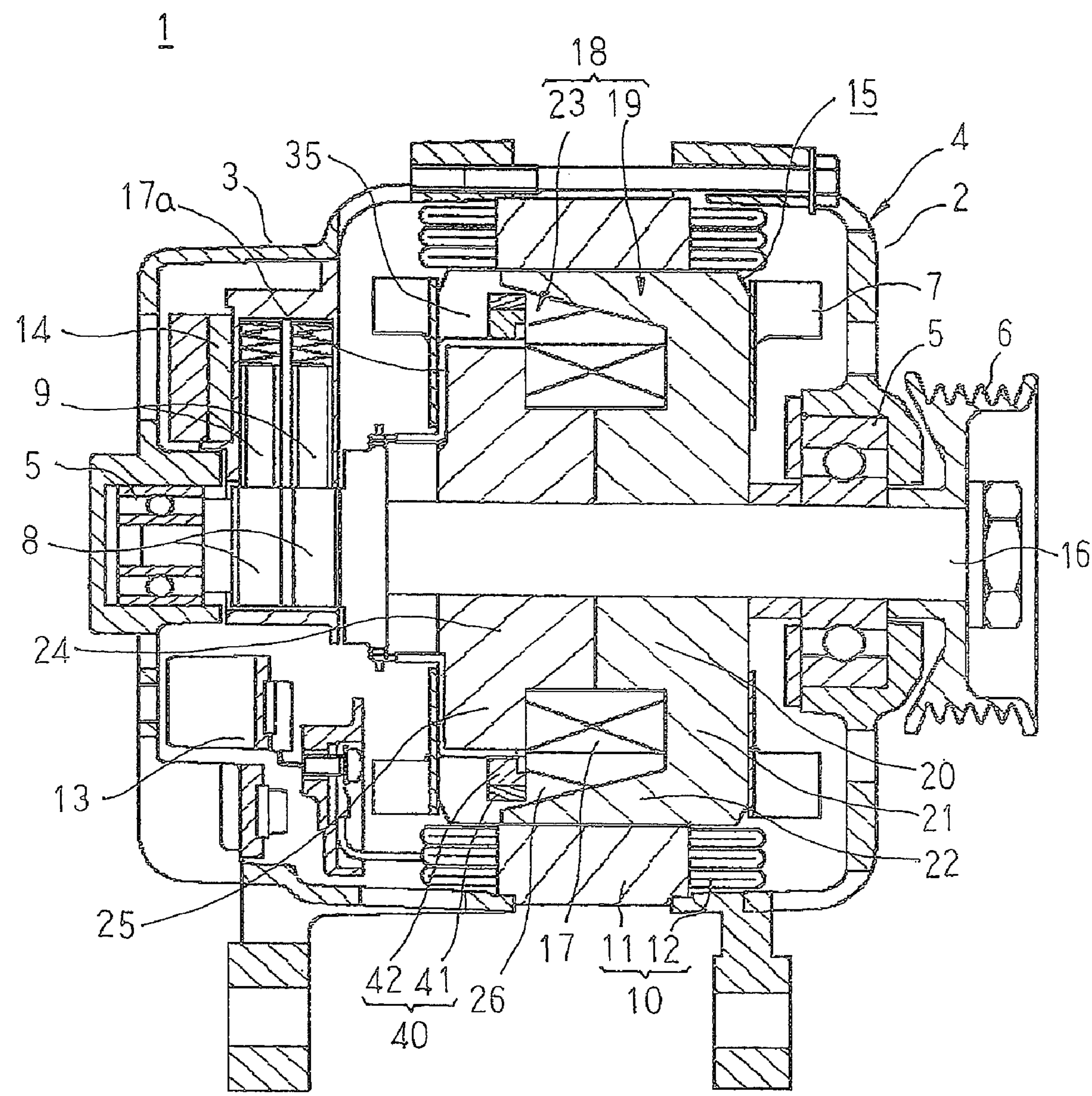
FIG. 1 is a cross section that schematically shows an automotive alternator according to Embodiment 1 of the present invention.
Figure 2:
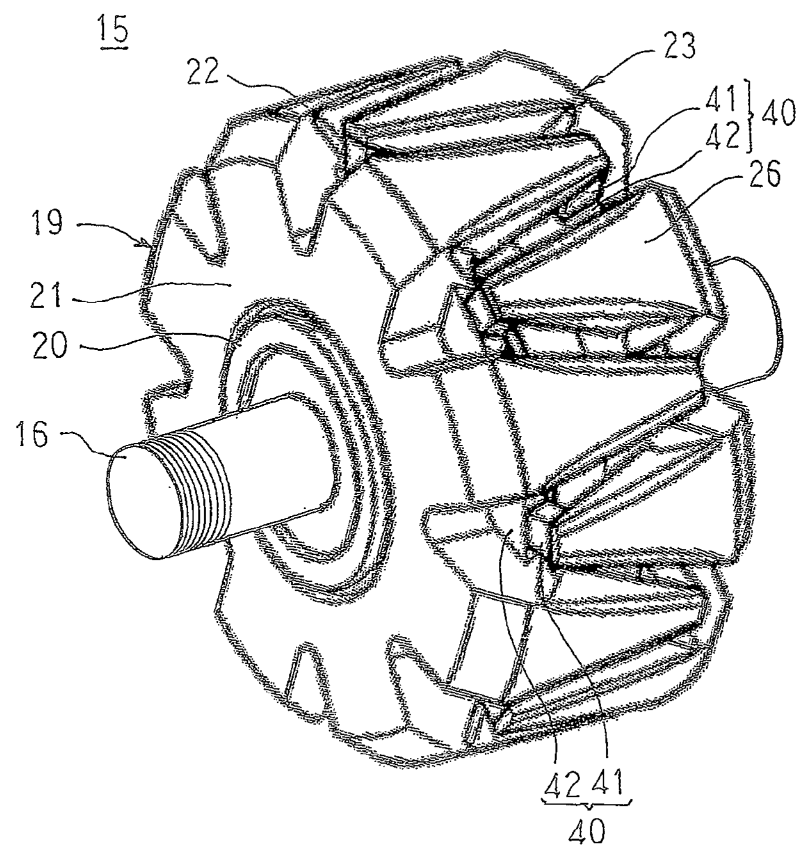
FIG. 2 is a perspective that shows a rotor that is used in the automotive alternator according to Embodiment 1 of the present invention.
Figure 3:
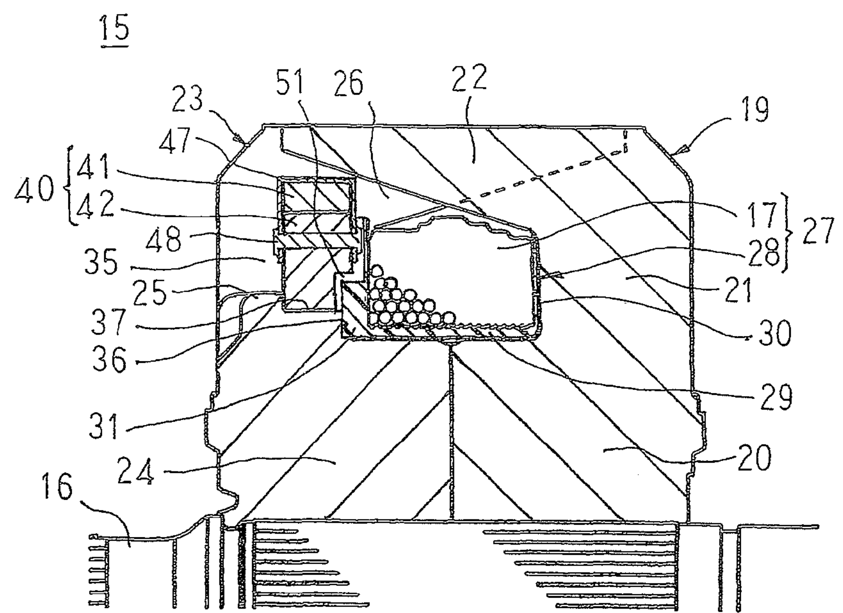
FIG. 3 is a cross section that shows the rotor that is used in the automotive alternator according to Embodiment 1 of the present invention.
Figure 4:
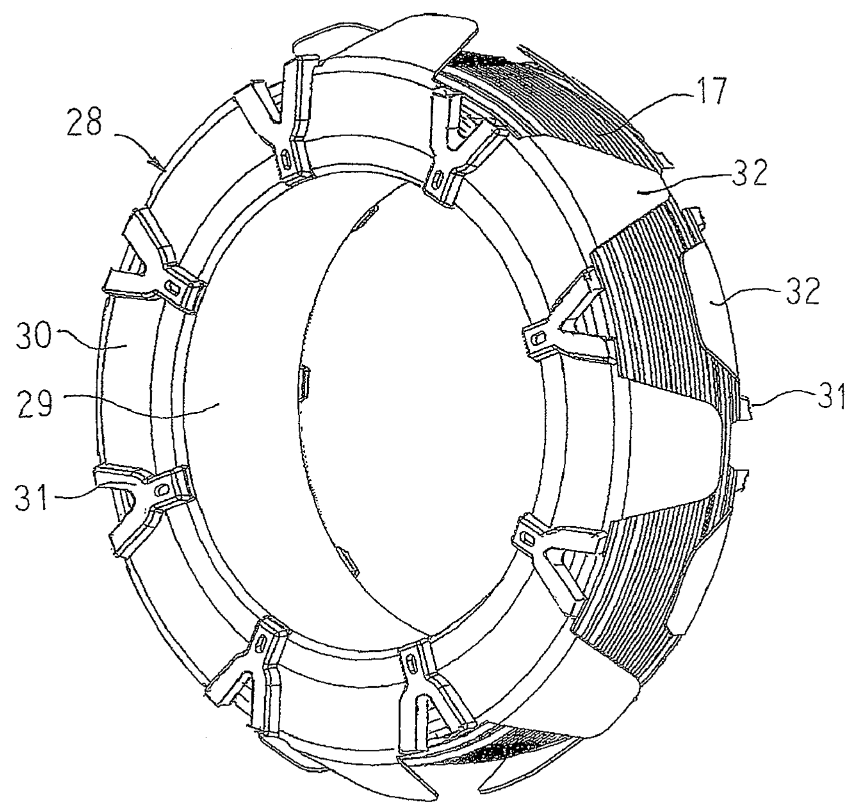
FIG. 4 is a perspective that shows a field coil assembly that is installed in the rotor that is used in the automotive alternator according to Embodiment 1 of the present invention.
Figure 5:
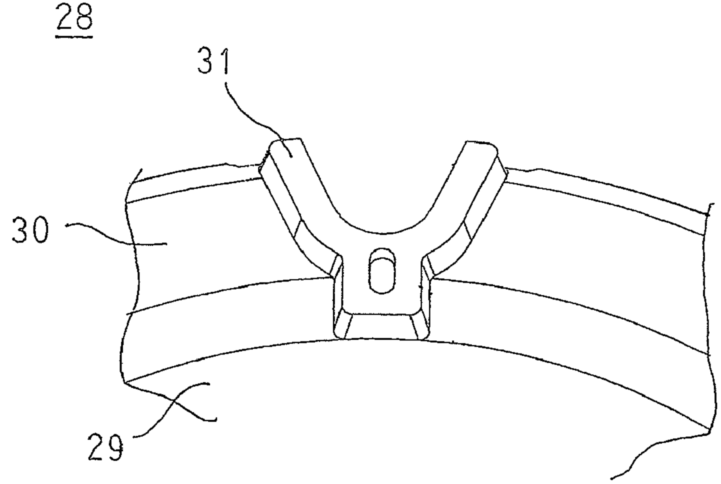
FIG. 5 is a side elevation that shows part of a bobbin of the field coil assembly that is installed in the rotor that is used in the automotive alternator according to Embodiment 1 of the present invention.
Figure 6A:
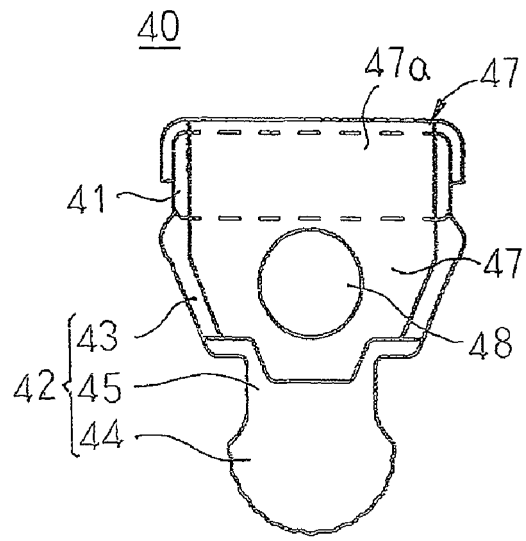
FIG. 6A is a diagram that explains a configuration of a permanent magnet assembly that is mounted to the rotor that is used in the automotive alternator according to Embodiment 1 of the present invention.
Figure 6B:
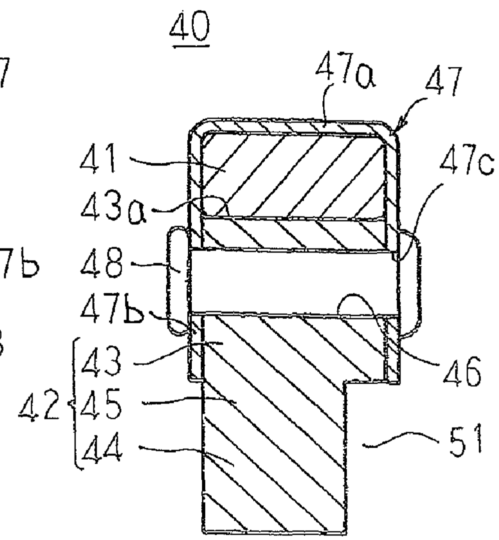
FIG. 6B is a diagram that explains the configuration of the permanent magnet assembly that is mounted to the rotor that is used in the automotive alternator according to Embodiment 1 of the present invention.
Figure 7:
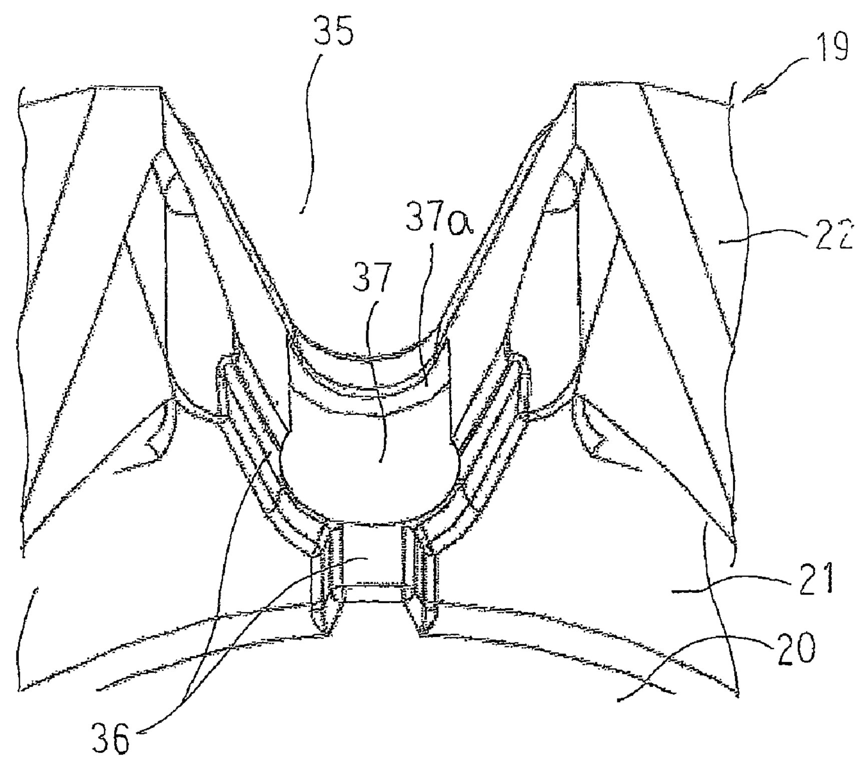
FIG. 7 is a partial perspective that explains a construction of a trough portion of a pole core in the rotor that is used in the automotive alternator according to Embodiment 1 of the present invention.

FIG. 1 is a cross section that schematically shows an automotive alternator according to Embodiment 1 of the present invention, FIG. 2 is a perspective of a rotor that is used in the automotive alternator according to Embodiment 1 of the present invention, FIG. 3 is a cross section of the rotor that is used in the automotive alternator according to Embodiment 1 of the present invention, FIG. 4 is a perspective of a field coil assembly that is installed in the rotor that is used in the automotive alternator according to Embodiment 1 of the present invention, and FIG. 5 is a side elevation of part of a bobbin of the field coil assembly that is installed in the rotor that is used in the automotive alternator according to Embodiment 1 of the present invention. FIGS. 6A and 6B are diagrams that explain a configuration of a permanent magnet assembly that is mounted to the rotor that is used in the automotive alternator according to Embodiment 1 of the present invention, FIG. 6A showing a front elevation, and FIG. 6B showing a cross section. FIG. 7 is a perspective that explains a construction of a trough portion of a pole core in the rotor that is used in the automotive alternator according to Embodiment 1 of the present invention, and a diagram that shows a state in which the permanent magnet assembly is mounted to the pole core of the rotor that is used in the automotive alternator according to Embodiment 1 of the present invention viewed from axially inside.

In FIGS. 1 through 5, an automotive alternator 1 that functions as a rotary electric machine includes: a case 4 that is constituted by a front bracket 2 and a rear bracket 3 that are each made of aluminum so as to have an approximate cup shape; a rotor 15 that is rotatably disposed inside the case 4 such that a shaft 16 is supported by means of bearings 5 in the case 4; a pulley 6 that is fixed to an end portion of the shaft 16 that extends outward at a front end of the case 4; fans 7 that are fixed to two axial end surfaces of the rotor 15; a stator 10 that is fixed to the case 4 so as to surround an outer circumference of the rotor 15 so as to have a constant air gap with respect to the rotor 15; a pair of slip rings 8 that are fixed to a rear end of the shaft 16, and that supply current to the rotor 15; a pair of brushes 9 that are disposed inside the case 4 so as to slide on the respective slip rings 8; a rectifier 13 that rectifies an alternating current that is generated in the stator 10 into direct current; and a voltage regulator 14 that adjusts magnitude of an alternating voltage that is generated in the stator 10.

The stator 10 includes: a cylindrical stator core 11; and a stator coil 12 that is mounted to the stator core 11, and in which an alternating current arises due to changes in magnetic flux from a field coil 17 (described below) that accompany rotation of the rotor 15.

The rotor 15 includes: a field coil 17 that generates magnetic flux on passage of an excitation current; a pole core 18 that is disposed so as to cover the field coil 17 and in which magnetic poles are formed by that magnetic flux; and the shaft 16, which is fitted through a central axial position of the pole core 18.

The pole core 18 is configured so as to be divided into first and second pole core bodies 19 and 23 that are each made by a cold forging manufacturing method using a low carbon steel such as S10C.

The first pole core body 19 has: a first boss portion 20 that has an outer circumferential surface that has a cylindrical shape, and in which a shaft insertion aperture is formed so as to pass through at a central axial position; a thick ring-shaped first yoke portion 21 that is disposed so as to extend radially outward from a first end edge portion of the first boss portion 20; and first claw-shaped magnetic pole portions 22 that are disposed so as to extend toward a second axial end from outer circumferential portions of the first yoke portion 21. Eight, for example, first claw-shaped magnetic pole portions 22 are formed so as to have a tapered shape in which a radially-outermost surface shape is an approximately trapezoidal shape, a circumferential width gradually becomes narrower toward a tip end, and thickness in a radial direction gradually becomes thinner toward the tip end, and are arranged on the outer circumferential portions of the first yoke portion 21 at a uniform angular pitch circumferentially.

The second pole core body 23 has: a second boss portion 24 that has an outer circumferential surface that has a cylindrical shape, and in which a shaft insertion aperture is formed so as to pass through at a central axial position; a thick ring-shaped second yoke portion 25 that is disposed so as to extend radially outward from a second end edge portion of the second boss portion 24; and second claw-shaped magnetic pole portions 26 that are disposed so as to extend toward a first axial end from outer circumferential portions of the second yoke portion 25. Eight, for example, second claw-shaped magnetic pole portions 26 are formed so as to have a tapered shape in which a radially-outermost surface shape is an approximately trapezoidal shape, a circumferential width gradually becomes narrower toward a tip end, and thickness in a radial direction gradually becomes thinner toward the tip end, and are arranged on the outer circumferential portions of the second yoke portion 25 at a uniform angular pitch circumferentially.

The bobbin 28 is a resin-molded body that is made of an insulating resin, and includes: a drum portion 29 that is mounted so as to be fitted over the first and second boss portions 20 and 24; a pair of flange portions 30 that are disposed so as to extend radially outward from two axial ends of the drum portion 29; eight rotation arresting portions 31 that are disposed so as to project at a uniform angular pitch from each of the pair of flange portions 30; and cover portions 32 that are disposed so as to extend from outer circumferential edge portions of the pair of flange portions 30 so as to cover the field coil 17 that is wound onto the drum portion 29. Each of the rotation arresting portions 31 is configured so as to have a Y-shaped thick portion that is disposed so as to project axially outward from each of the flange portions 30. A field coil assembly 27 is made by winding a conducting wire that constitutes the field coil 17 into multiple layers on the drum portion 29 of the bobbin 28.

As shown in FIG. 7, trough portions 35 are formed so as to have U-shapes that curve concavely radially inward at respective portions of the first yoke portion 21 between circumferentially adjacent first claw-shaped magnetic pole portions 22. These trough portions 35 that are curved radially inward pass through the first yoke portion 21 axially such that circumferential widths thereof become gradually narrower toward a radially inner side. Rotation arresting portion housing recess portions 36 are formed on (axially inner) edge portions of the trough portions 35 near the field coil 17 and on axially inner portions of the first yoke portion 21 at lower portions of the trough portions 35 so as to have axial depths that are equal to wall thicknesses of the rotation arresting portions 31 and internal shapes that conform to external shapes of the rotation arresting portions 31. In addition, interfitting grooves 37 that have major arc cross sections are formed so as to expand near a bottom portion of the trough portions 35 so as to have groove directions in an axial direction, and so as to have predetermined lengths outward from axially inside. Here, the interfitting grooves 37 do not pass through the trough portions 35 of the first yoke portion 21 axially, but have bottom surfaces 37*a* that are perpendicular to an axial direction that function as stopping portions.

Moreover, although not explained, trough portions 35, rotation arresting portion housing recess portions 36, and interfitting grooves 37 are also formed on the second yoke portion 25 in a similar manner.

As shown in FIGS. 6A and 6B, a permanent magnet assembly 40 includes: a permanent magnet 41; a magnet holding seat 42 that holds the permanent magnet 41; and a cover 47 and a rivet 48 that fix the permanent magnet 41 to the magnet holding seat 42. The permanent magnet 41 is made into a quadrangular prism that has a rectangular bottom surface and that has a predetermined height, using a neodymium-iron-boron rare earth sintered magnet, for example. Here, the directions that are parallel to the two adjacent sides of the bottom surface of the permanent magnet 41 will be designated a width direction and a longitudinal direction, respectively. In the rotor 15 in which the permanent magnet assemblies 40 are disposed, the width direction, the longitudinal direction, and a height direction are in the circumferential direction, the axial direction, and the radial direction of the rotor 15.

The magnet holding seat 42 is made into an integrated body by casting using a magnetic material such as iron or a ferroalloy, and has: a magnet holding portion 43 that has an isosceles trapezoidal cross section; an interfitting portion 44 that has a major-arc cross section; and a linking portion 45 that links a short side (an upper side) of the isosceles trapezoidal cross section of the magnet holding portion 43 and a chord of the major-arc cross section of the interfitting portion 44.

An upper surface of the magnet holding portion 43 that is constituted by a long side (a lower side) of the isosceles trapezoidal cross section constitutes a magnet mounting surface 43*a*. This magnet mounting surface 43*a* is formed so as to have a rectangular shape that has a width and a length that are equal to those of the permanent magnet 41. Moreover, the long side of the isosceles trapezoidal cross section of the magnet holding portion 43 is the width of the magnet mounting surfaces 43*a*. The magnet holding portion 43 is made so as to have a shape in which side surfaces that are constituted by the opposite sides of the isosceles trapezoidal cross section that are not parallel contact side surfaces of the trough portion 35 that face each other circumferentially when the permanent magnet assembly 40 is mounted to the trough portion 35. In addition, a rivet insertion aperture 46 is formed so as to pass longitudinally through a central position of the magnet holding portion 43.

The interfitting portion 44 is formed so as to have a cross-sectional shape that can be press fitted into and fixed to the interfitting groove 37. The interfitting portion 44 and the linking portion 45 are formed so as to have a length that is shorter than the magnet holding portion 43 to form a stepped portion 51 that is set back in a first longitudinal direction.

The cover 47 is made by press-molding a flat plate of a nonmagnetic material such as a stainless alloy, and has: a crown portion 47*a* that covers an upper surface of the permanent magnet that is mounted to the magnet mounting surface 43*a* of the magnet holding seat 42, two end surfaces that face each other in the longitudinal direction, and two side surfaces that face each other in the width direction; flange portions 47*b* that extend from the crown portion 47*a* so as to cover two end surfaces of the magnet holding portion 43 that face each other in the longitudinal direction; and rivet insertion apertures 47*c* that are opened through the flange portions 47*b*.

The permanent magnet 41 is placed on the magnet mounting surface 43*a* of the magnet holding seat 42, and the cover 47 is mounted so as to envelop the permanent magnet 41 in the crown portion 47*a*. Next, the permanent magnet assembly 40 is assembled by inserting the rivet 48 through the rivet insertion apertures 47*c* and the rivet insertion aperture 46 that is formed on the magnet holding portion 43, and crimping a head portion of the rivet 48. The permanent magnet 41 is thereby held in a magnetically connected state by the magnet holding seat 42 so as to be in contact with the magnet mounting surface 43*a* and movement is restricted in the width direction, in the longitudinal direction, and in the height direction by the cover 47.

Figure 8:
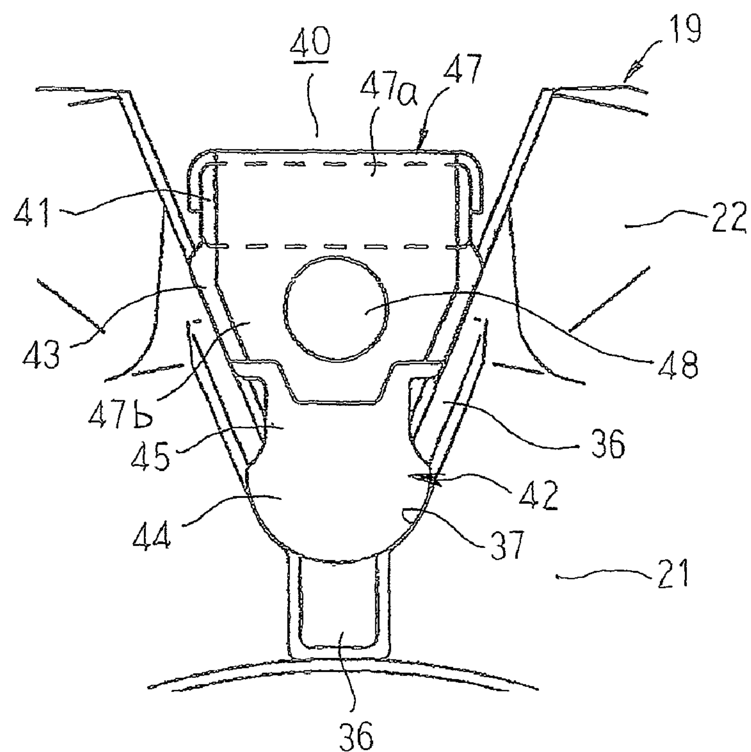
FIG. 8 is a diagram that shows a state in which the permanent magnet assembly is mounted to the pole core of the rotor that is used in the automotive alternator according to Embodiment 1 of the present invention viewed from axially inside.

As shown in FIG. 8, permanent magnet assemblies 40 that are assembled in this manner are mounted into the respective trough portions 35 of the first pole core body 19 from axially inside the first pole core body 19 by press fitting the interfitting portions 44 into the interfitting grooves 37 until contact is made with the bottom surfaces 37*a*. Here, radially outward movement of the permanent magnet assemblies 40 is restricted by the groove shapes of the interfitting grooves 37 that have a major arc cross sections, circumferential movement is restricted by the side surfaces of the magnet holding portions 43 contacting the side surfaces of the trough portions 35 that face each other circumferentially, and axially outward movement is restricted by the interfitting portions 44 coming into contact with the bottom surfaces 37*a* of the interfitting grooves 37.

The magnet holding seats 42 are held in each of the trough portions 35 of the first pole core body 19 so as to be connected magnetically by an outer circumferential surface of the interfitting portions 44 contacting an inner circumferential surface of the interfitting grooves 37. Moreover, permanent magnet assemblies 40 are also mounted to the trough portions 35 of the second pole core body 23 in a similar manner.

To assemble the rotor 15, the first and second pole core bodies 19 and 23 in which a permanent magnet assembly 40 is mounted to each of the trough portions 35 are fixed to the shaft 16 that has been fitted through the shaft insertion apertures such that the first and second claw-shaped magnetic pole portions 22 and 26 alternately intermesh and a second end surface of the first boss portion 20 is abutted to a first end surface of the second boss portion 24. Here, the first and second boss portions 20 and 24 and the first and second yoke portions 21 and 25 correspond to a boss portion and first and second yoke portions of the pole core 18.

In a rotor 15 that is assembled in this manner, the field coil assembly 27 is housed in a space that is surrounded by the first and second boss portions 20 and 24, the first and second yoke portions 21 and 25, and the first and second claw-shaped magnetic pole portions 22 and 26 by inserting the first and second boss portions 20 and 24 inside the drum portion 29 of the bobbin 28. The cover portions 32 extend from outer circumferential edge portions of the pair of flange portions 30 so as to cover the field coil 17 that is wound onto the drum portion 29, ensuring electrical insulation between the field coil 17 and the first and second claw-shaped magnetic pole portions 22 and 26. The rotation arresting portions 31 of the bobbin 28 are housed inside the rotation arresting portion housing recess portions 36 that are formed on the first and second yoke portions 21 and 25, restricting rotation of the bobbin 28 and also performing circumferential positioning of the bobbin 28. In addition, the rotation arresting portions 31 can be prevent the permanent magnet assemblies 40 from being pulled out axially inward.

Here, the permanent magnets 41 are disposed in the respective trough portions 35 so as to face inner circumferential surfaces near tip ends of the first and second claw-shaped magnetic pole portions 22 and 26, and are magnetically oriented so as to be opposite to an orientation of a magnetic field that the field current that flows through the field coil 17 produces in a plane that is perpendicular to a central axis of the rotor 15. Output wires 17*a* of the field coil 17 are led out through lead grooves (not shown) that are formed on bottom portions of two trough portions 35 of the second pole core body 23 so as to extend outward from axially inside, and are connected to the slip rings 8.

Next, operation of an automotive alternator 1 that is configured in this manner will be explained.

First, an electric current is supplied from a battery (not shown) to the field coil 17 of the rotor 15 by means of the brushes 9 and the slip rings 8 to generate magnetic flux. The first claw-shaped magnetic pole portions 22 of the first pole core body 19 are magnetized into North-seeking (N) poles by this magnetic flux, and the second claw-shaped magnetic pole portions 26 of the second pole core body 23 are magnetized into South-seeking (S) poles.

At the same time, rotational torque from an engine is transmitted to the shaft 16 by means of a belt (not shown) and the pulley 6, rotating the rotor 15. Thus, a rotating magnetic field is applied to the stator coil 12 of the stator 10, generating electromotive forces in the stator coil 12. The alternating currents generated by these electromotive forces are rectified into direct current by the rectifier 13 to charge the battery or to be supplied to electric loads.

Magnetic flux is generated when an electric current is passed through the field coil 17. This magnetic flux enters tooth portions of the stator core 11 by passing through the air gap from the first claw-shaped magnetic pole portions 22. The magnetic flux then passes circumferentially through a core back portion from the tooth portions of the stator core 11, and enters neighboring second claw-shaped magnetic pole portions 26 by passing through the air gap from the tooth portions that face those second claw-shaped magnetic pole portions 26. Next, the magnetic flux that has entered the second claw-shaped magnetic pole portions 26 passes through the second yoke portion 25, the second boss portion 24, the first boss portion 20, and the first yoke portion 21, and reaches the first claw-shaped magnetic pole portions 22. Now, in a conventional Lundell rotor, because the first and second pole core bodies 19 and 23 are at their design limit, they are magnetically saturated by the magnetic field that is generated by the field coil 17, reducing magnetic flux that is generated by the rotor.

Here, because the permanent magnets 41 are magnetically oriented so as to be opposite to the orientation of the magnetic field that is generated by the field coil 17, the magnetic flux that originates from the permanent magnets 41 is in a reverse direction to the magnetic flux 34*a* that originates from the field coil 17, enabling the magnetic flux density of the magnetic bodies that constitute the first and second pole core bodies 19 and 23 to be reduced significantly, thereby enabling magnetic saturation to be relieved. Thus, the magnetic flux that interacts with the stator 10 is increased, enabling generated power to be increased.

Because the permanent magnets 41 are disposed so as to face inner circumferential surfaces near tip ends of the first and second claw-shaped magnetic pole portions 22 and 26, the permanent magnets 41 are positioned radially inside an outermost circumferential surface of the rotor 15. Thus, stator slot harmonics are confined to outermost circumferential portions of the first and second claw-shaped magnetic pole portions 22 and 26, and do not act to heat the permanent magnets 41 by direct induction. As a result, the permanent magnets 41 are prevented from being heated and thermally demagnetized.

According to Embodiment 1, interfitting grooves 37 that have major arc cross sections are formed on bottom portions of each of the trough portions 35 of the first and second pole core bodies 19 and 23 outward from axially inside so as to have groove directions in the axial direction, and rotation arresting portion housing recess portions 36 are formed on axially inner edge portions of the trough portions 35 of the first and second yoke portions 21 and 25 so as to have internal shapes that conform to the external shapes of the Y-shaped rotation arresting portions 31. In magnet holding seats 42, end surfaces of an interfitting portion 44 and a linking portion 45 in a first longitudinal direction (axially inward) are displaced by a predetermined amount in a second longitudinal direction (axially outward) with respect to end surfaces of the magnet holding portions 43 in the first longitudinal direction to form stepped portions 51 that are set back in the first longitudinal direction.

Thus, the rotation arresting portions 31 can be housed inside spaces that are formed by the rotation arresting portion housing recess portions 36 and the stepped portions 51 of the magnet holding seats 42 simply by mounting the field coil assembly 27 onto the first and second pole core bodies 19 and 23 in which the permanent magnet assemblies 40 have been mounted to the trough portions 35 by fitting the interfitting portions 44 of the magnet holding seats 42 into the interfitting grooves 37, and integrating the first and second pole core bodies 19 and 23. A rotor 15 in which rotation of the field coil assembly 27 around the shaft 16 is prevented can thereby be assembled easily. In addition, even if a high angular speed is applied to the bobbin 28 by operating the automotive alternator 1 at high speed, rotation of the field coil assembly 27 around the shaft 16 is prevented, enabling breakage of the output wires 17*a* of the field coil 17 to be prevented.

Because the stepped portions 51 are disposed on the magnet holding seats 42, the magnet holding portions 43 can extend axially inward while avoiding interference with the rotation arresting portions 31, enabling axially inner positions of the permanent magnets 41 to be moved nearer to the field coil 17. In addition, because overlap between the permanent magnets 41 and the first and second claw-shaped magnetic pole portions 22 and 26 can be increased in an axial direction, magnetic flux that originates from the permanent magnets 41 flows between the permanent magnets 41 and the first and second claw-shaped magnetic pole portions 22 and 26 efficiently, enabling the amount of power generated to be increased.

Because the interfitting grooves 37 do not pass through the trough portions 35 axially but have crescent-shaped bottom surfaces 37*a* that are perpendicular to an axial direction, the magnet holding seats 42 can be positioned axially by press fitting the interfitting portions 44 into the interfitting grooves 37 until end surfaces of the interfitting portions 44 come into contact with the bottom surfaces 37*a*. In addition, the rotation arresting portions 31 are positioned axially inside the interfitting portions 44 that are fitted into the interfitting grooves 37, axial movement of the interfitting portions 44 is restricted by the bottom surfaces 37*a* and the rotation arresting portions 31, preventing the permanent magnet assemblies 40 from being pulled out axially inward.

Because the permanent magnets 41 are made into quadrangular prisms that have rectangular bottom surfaces, the volume of the permanent magnets 41 can be increased, enabling the amount of power generated to be increased, and yield is also increased, enabling manufacturing costs to be reduced.

Because the permanent magnets 41 are held on the magnet holding seats 42 by placing the permanent magnets 41 on the magnet mounting surfaces 43*a* of the magnet holding seats 42 and fixing the covers 47 that are mounted so as to envelop the permanent magnets 41 to the magnet holding seats 42, it is not necessary to form magnet holding constructions such as wedge-shaped magnet holding grooves on the magnet holding portions 43 of the magnet holding seats 42, facilitating preparation of the magnet holding seats 42. Because an entire upper surface of the magnet holding portion 43 can be used as the magnet mounting surface 43*a*, the permanent magnets 41 can be made into quadrangular prisms that have the magnet mounting surface 43*a* as a bottom surface, increasing the volume of the permanent magnets 41, thereby enabling the amount of power generated to be increased.

Because the magnet holding seats 42 are fixed to the covers 47 using rivets 48, assembly of the permanent magnet assemblies 40 is improved.

Because the covers 47 are made of a nonmagnetic material such as a stainless alloy, magnetic flux that originates in the permanent magnets 41 will not return to the magnet holding seats 42 through the covers 47, enabling the magnetic flux that originates in the permanent magnets 41 to be used efficiently.

Because the magnet holding seats 42 are held on the first and second pole core bodies 19 and 23 by fitting the interfitting portions 44 of the major-arc cross sections of the magnet holding seats 42 into the interfitting grooves 37 that are formed on the respective bottom portions of the trough portions 35 of the first and second pole core bodies 19 and 23 so as to have groove directions oriented in an axial direction, a holding construction for the magnet holding seats 42 that is highly resistant to centrifugal forces can be achieved by a simple construction.

Because the two side surfaces in the width direction of the magnet holding portions 43 are formed so as to contact the wall surfaces of the trough portions 35 of the first and second pole core bodies 19 and 23 that face each other circumferentially when the magnet holding seats 42 are held on the first and second pole core bodies 19 and 23, circumferential movement of the magnet holding seats 42 is restricted. Thus, resistance of the magnet holding seats 42 to angular acceleration is improved, increasing the holding strength of the permanent magnet assemblies 40, thereby increasing reliability.

Moreover, in Embodiment 1 above, permanent magnets are disposed in all of the trough portions, but permanent magnets may also be disposed in selected trough portions. In that case, it is desirable to dispose the permanent magnets in a well-balanced manner circumferentially. For example, permanent magnets may also be disposed in all of the trough portions of the second pole core body while not disposing any permanent magnets in the first pole core body. Permanent magnets may also be disposed in every second trough portion in a circumferential direction in both the first and second pole core bodies. Alternatively, permanent magnet assemblies may also be disposed in every second trough portion in a circumferential direction in both the first and second pole core bodies, and only magnet holding seats disposed in remaining trough portions. Although adopting this kind of configuration reduces the amount of power generated slightly compared to when the permanent magnets are disposed in all of the trough portions, the number of parts can be reduced, enabling costs to be reduced.

In Embodiment 1 above, the covers are fixed to the magnet holding seats by rivets, but the means for fixing the covers to the magnet holding seats is not limited to rivets, and for example, the covers may also be fixed to the magnet holding seats by solder, or the covers may be fixed to the magnet holding seats elastically using the elasticity of the covers.

In Embodiment 1 above, the covers are made of a nonmagnetic material such as a stainless alloy, but the material of the covers is not limited to a nonmagnetic material, and may also be a magnetic material such as iron, for example.

Embodiment 2

Figure 9:
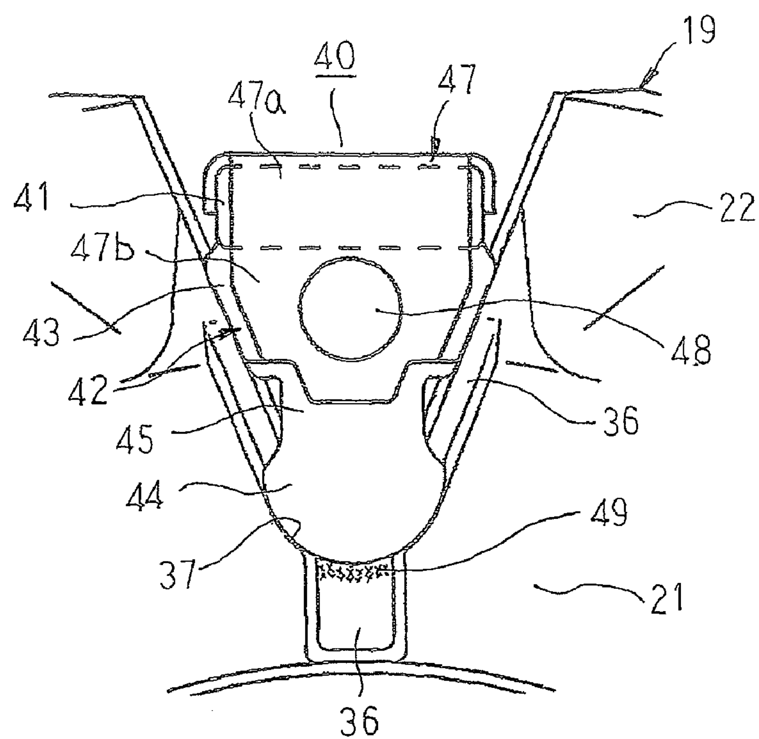
FIG. 9 is a diagram that shows a state in which a permanent magnet assembly is mounted to a pole core of a rotor that is used in an automotive alternator according to Embodiment 2 of the present invention viewed from axially inside.

FIG. 9 is a diagram that shows a state in which a permanent magnet assembly is mounted to a pole core of a rotor that is used in an automotive alternator according to Embodiment 2 of the present invention viewed from axially inside.

As shown in FIG. 9, in Embodiment 2, a magnet holding seat 42 is disposed in a trough portion 35 of a first pole core body 19 by fitting an interfitting portion 44 into an interfitting groove 37, and then interfitting strength between the interfitting portion 44 and the interfitting groove 37 is increased by crimping an edge portion of a bottom portion of the interfitting groove 37 near the rotation arresting portion housing recess portion 36. Moreover, although not shown, edge portions of bottom portions of interfitting grooves 37 of a second pole core body 23 near the rotation arresting portion housing recess portions 36 are crimped after the magnet holding seats 42 are disposed in the trough portions 35 by fitting the interfitting portions 44 into the interfitting grooves 37.

Moreover, the rest of the configuration is configured in a similar manner to Embodiment 1 above.

According to Embodiment 2, because interfitting strength between the interfitting portions 44 and the interfitting grooves 37 is increased by the crimping portions 49 that are formed on the edge portions of the bottom portions of the interfitting grooves 37 of the first and second pole core bodies 19 and 23 near the rotation arresting portion housing recess portions 36, resistance of the magnet holding seats 42 to centrifugal forces is increased, achieving superior reliability.

Embodiment 3

Figure 10:
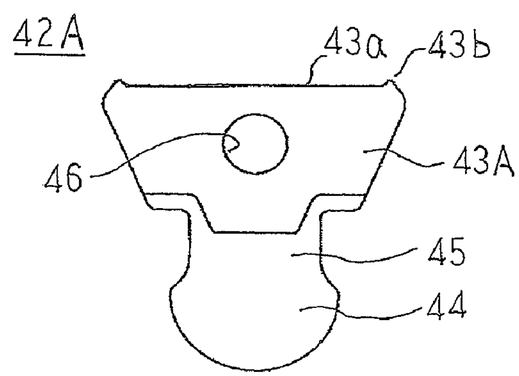
FIG. 10 is a front elevation that shows a magnet holding seat that is used in an automotive alternator according to Embodiment 3 of the present invention.

FIG. 10 is a front elevation that shows a magnet holding seat that is used in an automotive alternator according to Embodiment 3 of the present invention.

In FIG. 10, a magnet holding seat 42A includes: a magnet holding portion 43A in which a pair of positioning lugs 43*b* are disposed so as to project from two ends in a width direction of a magnet mounting surface 43*a* so as to extend longitudinally; an interfitting portion 44; and a linking portion 45.

Moreover, the rest of the configuration is configured in a similar manner to Embodiment 1 above.

According to Embodiment 3, because the pair of positioning lugs 43*b* are disposed so as to project from the two ends in the width direction of the magnet mounting surfaces 43*a* of the magnet holding portions 43A so as to extend longitudinally, positioning of the permanent magnets 41 is facilitated, improving assembly of the permanent magnet assemblies.

Embodiment 4

Figure 11:
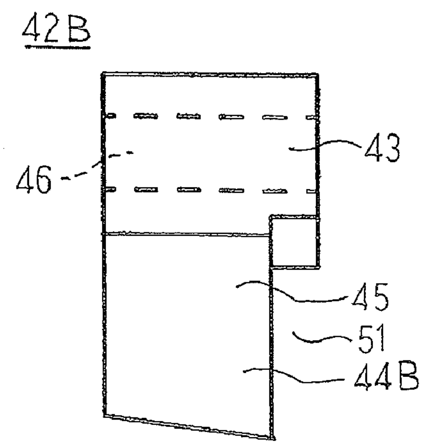
FIG. 11 is a side elevation that shows a magnet holding seat that is used in an automotive alternator according to Embodiment 4 of the present invention.

FIG. 11 is a side elevation that shows a magnet holding seat that is used in an automotive alternator according to Embodiment 4 of the present invention.

In FIG. 11, a magnet holding seat 42B includes: a magnet holding portion 43; an interfitting portion 44B that is formed such that a central position of a major-arc cross section is constant from a first longitudinal end toward a second end, and a radius thereof decreases gradually from the first longitudinal end toward the second end; and a linking portion 45. Although not shown, interfitting grooves that are formed on trough portions of first and second pole core bodies are formed so as to have groove shapes in which a central position of a major-arc cross section is constant outward from axially inside, and a radius thereof decreases gradually outward from axially inside.

Moreover, the rest of the configuration is configured in a similar manner to Embodiment 1 above.

According to Embodiment 4, because the radii of the major-arc cross sections of the interfitting portions 44B decrease gradually from the first longitudinal end toward the second end, the external shapes of the interfitting portions 44B are tapered. In addition, because the radii of the major-arc cross sections of the interfitting grooves decrease gradually outward from axially inside, the internal shapes of the interfitting grooves are tapered. Thus, press fitting of the interfitting portions 44B into the interfitting grooves is facilitated, improving rotor assembly.

Embodiment 5

Figure 12A:
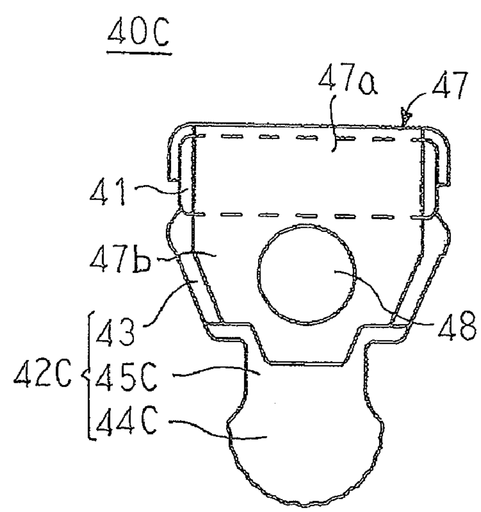
FIG. 12A is a diagram that explains a configuration of a permanent magnet assembly that is mounted to a rotor that is used in an automotive alternator according to Embodiment 5 of the present invention.
Figure 12B:
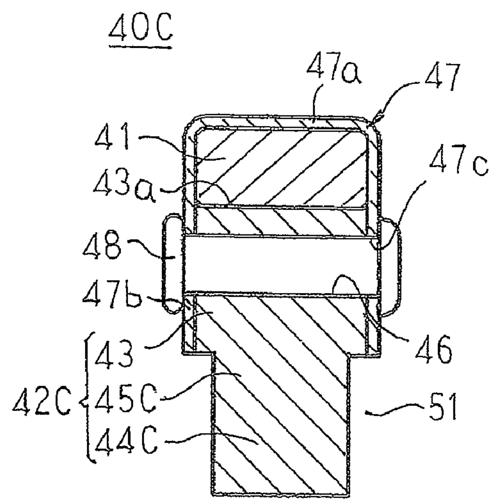
FIG. 12B is a diagram that explains the configuration of the permanent magnet assembly that is mounted to the rotor that is used in the automotive alternator according to Embodiment 5 of the present invention.

FIGS. 12A and 12B are diagrams that explain a configuration of a permanent magnet assembly that is mounted to the rotor that is used in the automotive alternator according to Embodiment 5 of the present invention, FIG. 12A showing a front elevation, and FIG. 12B showing a cross section.

In FIG. 12, a magnet holding seat 42C includes: a magnet holding portion 43; an interfitting portion 44C; and a linking portion 45C. The interfitting portion 44C and the linking portion 45C are formed so as to have lengths that are shorter than the magnet holding portion 43 to form a stepped portion 51 that is set back by a similar amount at two longitudinal ends with respect to the magnet holding portion 43.

Moreover, the rest of the configuration is configured in a similar manner to Embodiment 1 above.

In Embodiment 5, when disposed in the trough portions 35 of the first and second pole core bodies 19 and 23, permanent magnet assemblies 40C have plane symmetry in a plane that includes a central axis of the shaft 16 and that passes through center in a width direction of the permanent magnet assembly 40C, and have plane symmetry in a plane that is perpendicular to the central axis of the shaft 16 and that passes through center in a longitudinal direction (an axial direction) of the permanent magnet assembly 40C. Thus, when centrifugal forces act on the permanent magnet assemblies 40C, moments that rotate the permanent magnet assemblies 40C around the centers of the major-arc cross sections of the interfitting portions 44C in a plane that is perpendicular to the central axis of the shaft 16 and that passes through center in a longitudinal direction (an axial direction) of the permanent magnet assembly 40C, and also moments that rotate the permanent magnet assemblies 40C around the centers of the major-arc cross sections at longitudinally central positions of the interfitting portions 44C in a plane that includes a central axis of the shaft 16 and that passes through centers in a width direction of the permanent magnet assemblies 40C are less likely to arise. As a result, tilting of the permanent magnet assemblies 40C is suppressed.

Embodiment 6

Figure 13A:
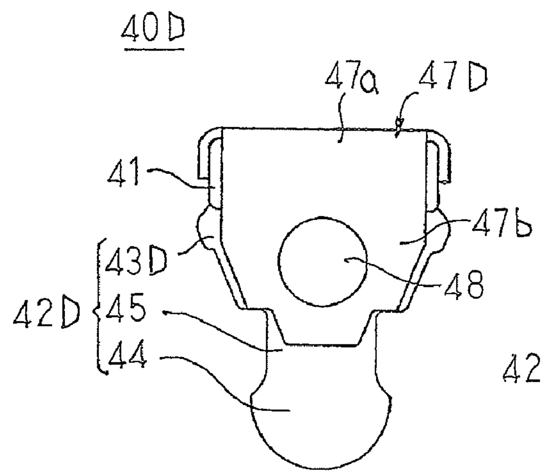
FIG. 13A is a diagram that explains a configuration of a permanent magnet assembly that is mounted to a rotor that is used in an automotive alternator according to Embodiment 6 of the present invention.
Figure 13B:
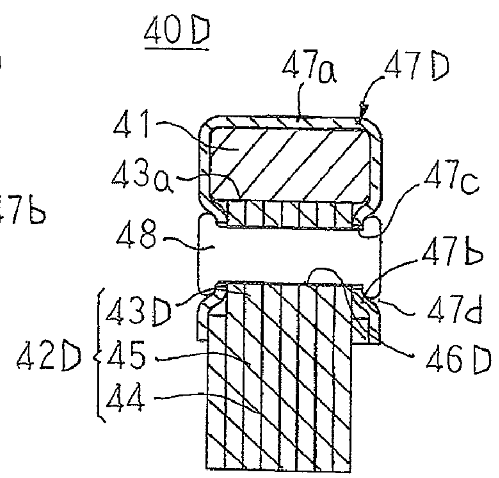
FIG. 13B is a diagram that explains the configuration of the permanent magnet assembly that is mounted to the rotor that is used in the automotive alternator according to Embodiment 6 of the present invention.

FIGS. 13A and 13B are diagrams that explain a configuration of a permanent magnet assembly that is mounted to the rotor that is used in the automotive alternator according to Embodiment 6 of the present invention, FIG. 13A showing a front elevation, and FIG. 13B showing a cross section.

In FIG. 13, a magnet holding seat 42D is made by laminating thin plates that are obtained by pressing and shaping magnetic steel plates, for example, and includes: a magnet holding portion 43D; an interfitting portion 44; and a linking portion 45. Outside diameters of two ends of a rivet insertion aperture 46D of the magnet holding portion 43D are larger in diameter than head portions of a rivet 48. A cover 47D has recess portions 47*d* that are formed by setting back portions of flange portions 47*b* in a vicinity of a rivet insertion aperture 47*c*.

Moreover, the rest of the configuration is configured in a similar manner to Embodiment 1 above.

In Embodiment 6, the permanent magnet 41 is placed on the magnet mounting surface 43*a* of the magnet holding portion 43D, and the cover 47D is mounted so as to envelop the permanent magnet 41 in the crown portion 47*a*. Next, the permanent magnet assembly 40D is assembled by inserting the rivet 48 through the rivet insertion apertures 47*c* of the cover 47D and the rivet insertion aperture 46 that is formed on the magnet holding portion 43D, and crimping a head portion of the rivet 48. Here, the recess portions 47*d* of the cover 47D enter the large diameter portions of the rivet insertion aperture 46D, and the head portions of the rivet 48 enter the recess portions 47*d*. Thus, the head portions of the rivet 48 are flush with the surfaces of the flange portions 47*b* of the cover 47D.

According to Embodiment 6, because the head portions of the rivets 48 are flush with the flange portions 47*b* of the covers 47D, interference between the rivets 48 and the bobbin 28 is eliminated when the rotor is assembled, enabling axially inner positions of the magnet holding portions 43D, i.e., the permanent magnets 41, to be moved closer to the field coil 17. In addition, because overlap between the permanent magnets 41 and the first and second claw-shaped magnetic pole portions 22 and 26 can be increased in an axial direction, magnetic flux that originates from the permanent magnets 41 flows between the permanent magnets 41 and the first and second claw-shaped magnetic pole portions 22 and 26 efficiently, enabling the amount of power generated to be increased.

The axially inner positions of the magnet holding portions 43D can also be moved closer to the field coil 17. Thus, if the size of the permanent magnets 41 is kept constant, the groove length of the interfitting grooves can be shortened, enabling the service life of dies for machining the interfitting grooves to be improved. If the groove length of the interfitting grooves is kept constant, the volume of the permanent magnets 41 can be increased, enabling the amount of power generated to be increased.

Because the magnet holding seats 42D are made by laminating thin plates, rivet insertion aperture 46D in which diameters at two ends are made larger can be formed simply by changing the punched shapes of the thin plates, enabling manufacturing costs to be reduced compared to when magnet holding seats are made by casting.

Embodiment 7

Figure 14:
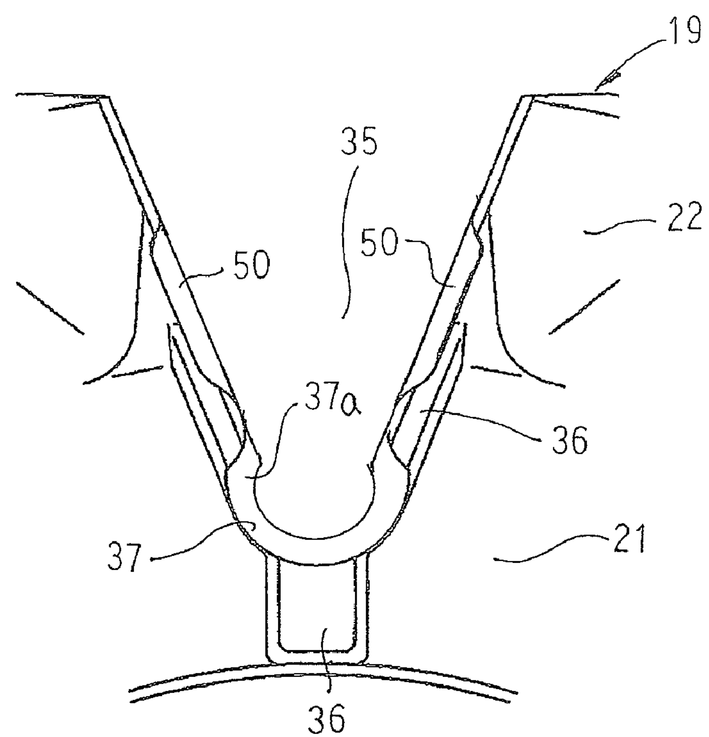
FIG. 14 is a diagram that shows a trough portion of a pole core in a rotor that is used in an automotive alternator according to Embodiment 7 of the present invention viewed from axially inside.
Figure 15:
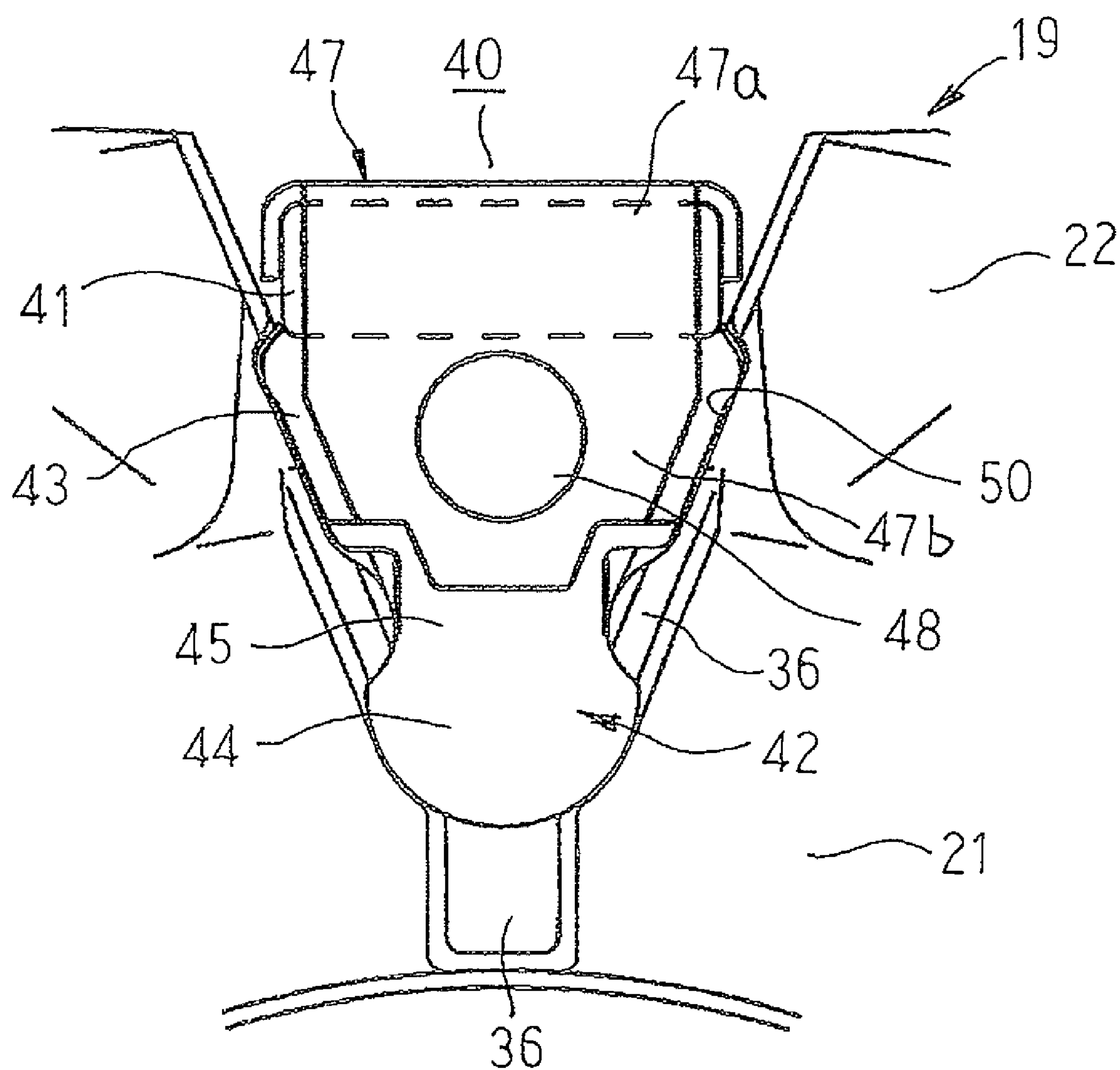
FIG. 15 is a diagram that shows a state in which a permanent magnet assembly is mounted to the pole core of the rotor that is used in the automotive alternator according to Embodiment 7 of the present invention viewed from axially inside.

FIG. 14 is a diagram that shows a trough portion of a pole core in a rotor that is used in an automotive alternator according to Embodiment 7 of the present invention viewed from axially inside, and FIG. 15 is a diagram that shows a state in which a permanent magnet assembly is mounted to the pole core of the rotor that is used in the automotive alternator according to Embodiment 7 of the present invention viewed from axially inside.

In FIG. 14, bearing surfaces 50 that are perpendicular to the axial direction are formed on side surfaces of trough portions 35 of a first yoke portion 21 that face each other circumferentially. Although not shown, bearing surfaces 50 are also formed on side surfaces of the trough portions 35 of a second yoke portion 25 that face each other circumferentially.

Moreover, the rest of the configuration is configured in a similar manner to Embodiment 1 above.

In Embodiment 7, as shown in FIG. 15, permanent magnet assemblies 40 are mounted into the respective trough portions 35 of the first pole core body 19 from axially inside the first pole core body 19 by inserting the interfitting portions 44 into the interfitting grooves 37 until contact is made with the bottom surfaces 37*a*. Permanent magnet assemblies 40 are also mounted to the respective trough portions 35 of the second pole core body 23 in a similar manner. Here, the interfitting portions 44 contact the bottom surfaces 37*a*, and first and second end portions in the width direction of end surfaces at second longitudinal ends of the magnet holding portions 43 contact the bearing surfaces 50.

According to Embodiment 7, because the interfitting portions 44 contact the bottom surfaces 37*a*, and the first and second end portions in the width direction of end the surfaces at the second longitudinal ends of the magnet holding portions 43 contact the bearing surfaces 50, axially outward movement of the permanent magnet assemblies 40 can be reliably prevented. In addition, moments that rotate the permanent magnet assemblies 40 around the centers of the major-arc cross sections at longitudinally central positions of the interfitting portions 44 in a plane that includes a central axis of the shaft 16 and that passes through the center in the width direction of the permanent magnet assemblies 40 are borne by the bearing surfaces 50, preventing tilting of the permanent magnet assemblies 40.

Moreover, in each of the above embodiments, the interfitting grooves are formed so as to have major arc cross sections, but it is only necessary for the cross-sectional shape of the interfitting grooves to be able to restrict circumferential and radial movement of the interfitting portions of the magnet holding seats that are fitted together with the interfitting grooves, and is not limited to a major arc.

In each of the above embodiments, explanations are given for automotive alternators, but the present invention is not limited to automotive alternators, and similar effects are also exhibited if the present invention is applied to rotary electric machines such as automotive electric motors, or automotive generator-motors.

What is claimed is:

1. A rotary electric machine comprising:
- a rotor comprising:
  - a pole core comprising:
    - a boss portion;
    - a pair of yoke portions that are disposed so as to extend radially outward from two axial end edge portions of said boss portion; and
    - a plurality of claw-shaped magnetic pole portions that are disposed so as to extend in an axial direction alternately from each of said pair of yoke portions, and that are arranged circumferentially so as to intermesh with each other,
    - a trough portion that curves radially inward being formed on a portion of each of said yoke portions between circumferentially adjacent claw-shaped magnetic pole portions, and said pole core being fixed to a shaft that is inserted through a central axial position of said boss portion; and
  - a field coil that is wound onto a bobbin that is mounted to said boss portion, and that is housed inside a space that is surrounded by said boss portion, said pair of yoke portions, and said plurality of claw-shaped magnetic pole portions;

a stator that is disposed so as to surround an outer circumference of said rotor; and a permanent magnet that is disposed in said trough portion so as to face an inner circumferential surface near a tip end of said claw-shaped magnetic pole portions, wherein said rotary electric machine further comprises:

an interfitting groove that is disposed in a bottom portion of said trough portion so as to have a groove direction that is axial and so as to extend axially outward from axially inside;

a rotation arresting portion housing recess portion that is formed on an axially inner opening edge portion of said interfitting groove on said yoke portions;

a magnet holding seat comprising:

an interfitting portion; and a magnet holding portion that is formed on an upper portion of said interfitting portion, said magnet holding seat being disposed in said trough portion such that radial movement is restricted by said interfitting portion being fitted into said interfitting groove; and a rotation arresting portion that is disposed so as to project axially outward from a flange portion of said bobbin;

wherein said magnet holding seat comprises a stepped portion that is formed by setting back an axially inner end surface of said interfitting portion axially outward relative to an axially inner end surface of said magnet holding portion;

wherein said bobbin is mounted to said rotor such that said rotation arresting portion is housed in a space that is formed by said rotation arresting portion housing recess portion and said stepped portion so as to restrict circumferential movement; and wherein said permanent magnet is made into a quadrangular prism that has a rectangular bottom surface, and is held by said magnet holding seat by placing said bottom surface on an upper surface of said magnet holding portion, and fixing to said magnet holding seat a cover that is mounted from radially outside to restrict circumferential, axial, and radial movement.

2. A rotary electric machine according to claim 1, wherein said magnet holding seat is configured such that two circumferential end surfaces of said magnet holding portion contact wall surfaces of said trough portion that face each other circumferentially.

3. A rotary electric machine according to claim 1, wherein positioning lugs are disposed so as to project from two circumferential side portions of said upper surface of said magnet holding portion.

4. A rotary electric machine according to claim 1, wherein said cover is fixed to said magnet holding seat by a rivet that is inserted axially through said magnet holding portion.

5. A rotary electric machine according to claim 4, wherein an axially inner head portion of said rivet is flush with said cover.

6. A rotary electric machine according to claim 1, wherein bearing surfaces are formed on wall surfaces of said trough portion that face each other circumferentially so as to contact two circumferential end portions of an axially outer end surface of said magnet holding portion.

7. A rotary electric machine according to claim 1, wherein said magnet holding seat is fixed to said pole core by crimping an edge portion of a bottom portion of said interfitting groove of said yoke portions near said rotation arresting portion housing recess portion.

8. A rotary electric machine according to claim 1, wherein said magnet holding seat is configured so as to have plane symmetry in a plane that passes through a circumferential center thereof, and that includes a central axis of said shaft, and so as to have plane symmetry in a plane that passes through an axial center thereof, and that is perpendicular to a central axis of said shaft.

9. A rotary electric machine according to claim 1, wherein said interfitting portion is formed so as to have a tapered shape in which an external shape thereof becomes gradually smaller axially outward from axially inside, and said interfitting groove is formed such that an internal shape thereof becomes gradually smaller axially outward from axially inside.

* * * * *